United States Patent
Palaniappan

(10) Patent No.: US 9,202,250 B1
(45) Date of Patent: Dec. 1, 2015

(54) SYSTEMS AND METHODS FOR DISTRIBUTING PAYABLES

(71) Applicant: ActiveHours, Inc., Palo Alto, CA (US)

(72) Inventor: Ramanathan Palaniappan, Palo Alto, CA (US)

(73) Assignee: ActiveHours, Inc., Palo Alto, CA (US)

( * ) Notice: Subject to any disclaimer, the term of this patent is extended or adjusted under 35 U.S.C. 154(b) by 0 days.

(21) Appl. No.: 14/295,976

(22) Filed: Jun. 4, 2014

Related U.S. Application Data

(60) Provisional application No. 61/831,407, filed on Jun. 5, 2013.

(51) Int. Cl.
    *G06F 15/02* (2006.01)
    *G07C 1/10* (2006.01)
    *G06Q 40/00* (2012.01)

(52) U.S. Cl.
    CPC .............. *G06Q 40/125* (2013.12); *G06Q 40/10* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 8,429,068 B1 * | 4/2013 | Fasoli et al. | 705/38 |
| 8,751,338 B2 * | 6/2014 | Dombroski et al. | 705/32 |
| 2001/0034676 A1 * | 10/2001 | Vasic | 705/30 |
| 2005/0075969 A1 * | 4/2005 | Nielson et al. | 705/38 |
| 2005/0109836 A1 * | 5/2005 | Ben-Aissa | 235/380 |
| 2006/0149569 A1 * | 7/2006 | Lal et al. | 705/1 |
| 2009/0132312 A1 * | 5/2009 | Reinheimer et al. | 705/7 |

* cited by examiner

*Primary Examiner* — Ryan Zeender
*Assistant Examiner* — Christopher Buchanan
(74) *Attorney, Agent, or Firm* — Goodwin Procter LLP

(57) ABSTRACT

A method and system for providing early payment for earned, accrued wages to a worker that includes receiving over an electronic network, from at least one of the worker and an employer's tracking and payment system, earnings data for the worker; receiving, from the worker, data for accessing and effecting transactions in an account associated with the worker; calculating an hourly wage for the worker; calculating the hours for which payment can be accelerated and for which payment cannot be accelerated; calculating a value of funds to be transferred to the worker based on the hourly wage and accelerated hours; and debiting the account associated with the worker based upon the calculated value of funds.

28 Claims, 4 Drawing Sheets

SYSTEMS AND METHODS FOR DISTRIBUTING PAYABLES

CROSS-REFERENCE TO RELATED APPLICATION

This application claims priority to U.S. Provisional Patent Application No. 61/831,407 filed on Jun. 5, 2013, which is incorporated by reference as if set forth herein in its entirety.

FIELD OF THE INVENTION

The invention relates generally to techniques for transferring funds among various parties, and, more specifically, to methods and supporting systems for capturing information regarding amounts payable to an employee or worker and making such amounts payable available to the employee or worker for their use prior to a regular pay date.

BACKGROUND OF THE INVENTION

Conventional employment relationships operate on an accrued wages model in which workers perform their jobs, record their time and/or attendance (in some instances), and after some period of time are paid wages for a preceding pay period. While many workers have adequate funds to pay their monthly expenses, due to infrequent indulgences such as a vacation, unexpected medical expenses or even unexpected outlays such as car repairs, many workers either live paycheck to paycheck, or simply need additional funds temporarily to cover unanticipated costs. In most cases, consumers may resort to credit cards, which have high fees and interest rates, friends and family (which may or may not be available or practical), bank overdraft, pawn shops or even short-term loans such as payday loans or the like, which typically have outrageously high fees and interest rates. All the while, the employer essentially "owes" the employee a certain portion of her wages for worked performed, but because the end of the pay period has not yet arrived, the employee cannot access or use these owed monies. What is needed, therefore, are techniques and supporting systems that facilitate early access to earned and accrued wages in an efficient and cost-effective manner without unduly burdening the employer or affecting the employer's accounting practices.

BRIEF SUMMARY OF THE INVENTION

In a first aspect, the present invention discloses a method for providing early payment for earned, accrued wages to a worker. In some embodiments, the method includes receiving over an electronic network, from at least one of the worker or an employer's tracking and payment system, earnings data for the worker and receiving, from the worker, data for accessing and effecting transactions in an account associated with the worker. The method also includes calculating an hourly wage for the worker, calculating the hours for which payment can be accelerated and for which payment cannot be accelerated, calculating a value of funds to be transferred to the worker based on the hourly wage and accelerated hours, and debiting the account associated with the worker based upon the calculated value of funds.

In a first variation, the worker's earnings data include a timesheet showing hours the worker worked for an employer. For example, timesheet may include pay data such as a worker's name, days worked by the worker, hours worked by the worker, work day clock-in start times, work day clock-out end times, global positioning data, an identifier of the worker, a worker number, a worker's department, a worker's break time, a classification of the hours worked by the worker, tips received by the worker, a worker's available sick time, and/or a worker's available vacation time.

In some variations, the worker's earnings data may also include information about the employer including a name of the employer, an employer's URL, an employer's business location, an employer's pay period, a timesheet system used by the employer, an identifier of the employer; hardware used by the employer, payroll software used by the employer, and/or paycodes for each set of classified hours. In some embodiments, the worker's earnings data includes a digital image from the worker, e.g., a digital image of a timesheet prepared by the worker. Furthermore, in some implementations the digital image may include information about a system time when the image was taken and/or geographical information about a location of the worker when the digital image was taken.

In some embodiments, an hourly wage is calculated for the worker using pay data from an account associated with the worker and the hours worked for the pay period from a timesheet. The worker may also provide data for accessing and effecting transactions in an account associated with the worker such as an account identification number; an account user identification; a login password; a login passcode; and/or an electronic token. The account associated with the worker may be debited based upon the calculated value of funds includes receiving from the worker a request for an accelerated payment of funds and/or establishing a reliability and sufficiency of the received earnings data. In some implementations, establishing reliability and sufficiency of received earnings data may include confirming that the worker was at a designated work location during work hours when the earnings data were transmitted, confirming that a name associated with the earnings data corresponds to a name associated with the account associated with the worker, confirming that the earnings data were captured at and employer's business location, and/or confirming that the earnings data correspond to the employer's tracking and payment system. More particularly, confirming the reliability of data may be determined by examining a worker's data fingerprint, such as using geocoding data to ensure the received earnings data were acquired at the employer's business location. Timestamp data, watermarks, QR codes, temperature sensors, accelerometers, and/or other sensors can be used to further confirm that the data captured is accurate and reliable.

In other variations, the method may further include analyzing a worker's spending habits and/or a worker's historical spending data to determine when the worker has disposable income or may be in need of additional income. In some implementations, the worker is alerted to the availability of disposable income and/or a third party merchant can be alerted of the worker's available disposable income. In further variations the method may also include monitoring the account associated with the worker for a negative balance and/or a likelihood of a negative balance. In some implementations, the funds to be transferred to the worker to eliminate the negative balance and/or avoid a negative balance.

A second aspect of the present invention is a system for providing payment for earned, accrued wages to a worker. In some embodiments, the system includes a memory for storing computer readable instructions, which, when executed by a processor, create an instance of an application operating on a mobile device and a processor for executing some of the stored computer readable instructions.

For example, in some variations execution of the instructions may include receiving, over an electronic network, worker's earnings data and receiving, from the worker, data for accessing and effecting transactions in an account associated with the worker. The system may also calculate an hourly wage for the worker, the worker's pay cycle, the hours for which payment can be or cannot be accelerated, a value of funds to be transferred to the worker based on the hourly wage and accelerated hours and debiting the account associated with the worker based upon the calculated value of funds.

In some implementations, the worker's earnings data include a timesheet showing hours the worker worked for an employer. For example, the timesheet may include pay data that include a worker's name, days worked by the worker, hours worked by the worker, work day clock-in start times, work day clock-out end times, global positioning data, an identifier of the worker, a worker number, a worker's department, a worker's break time, a classification of the hours worked by the worker, tips received by the worker, a worker's available sick time, and/or a worker's available vacation time. Worker's earnings data may also include information about the employer including a name of the employer, an employer's URL, an employer's business location, an employer's pay period, a timesheet system used by the employer, an identifier of the employer; hardware used by the employer, payroll software used by the employer, and/or paycodes for each set of classified hours.

In some variations, the worker's earnings data include a digital image received from the worker and the digital image includes information about a system time when the image was taken and/or geographical information about a location of the worker when the digital image was taken. The worker's earnings data may also include automated data provided by an employer's tracking and payment system. In still other variations, calculating an hourly wage for the worker may be calculated using pay data from the worker's account and the hours worked for the pay period from the timesheet; calculating the hours for which payment can be accelerated may be calculated based on the hours worked that have not yet been paid by the employer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE INVENTION

Figure 1:
FIG. 1 shows a flow chart of a method of capturing work time and accrued and unpaid wages that enables workers to access owed monies prior to the end of a pay period in accordance with some embodiments of the present invention.

The invention provides techniques and systems that allow employees, contractors, and consultants (generally referred to herein as "workers" or "users") to gain access to wages earned but not yet paid or received. As a result, the invention allows workers to use money earned but not yet paid by the worker's employer to pay bills, purchase goods and services, and otherwise enjoy their wages prior to the end of a pay period and before their employer has released the funds. Additional intended uses of the invention can include avoiding overdraft fees and avoiding carrying a balance on a credit card. This "payable" may be transferred to the worker, who may withdraw it as cash or use it as digital currency or virtual goods within an electronic marketplace.

In one particular embodiment, the worker may use a portable processing device, such as her mobile phone, smartphone, smartwatch, smartpad, Google® glass, tablet computer, or other mobile, wireless computing device ("client device") to capture data and images. The client device may also provide a platform for executing an application (or "app") that guides the worker through the process of capturing data. Specifically, in instances in which the client device includes an imaging device, e.g., a camera, the worker may periodically take an image of her timesheet, timecard, work schedule, and/or other documentation or system for capturing work hours ("earnings data"). For example, in addition to the worker using the client device and/or app to capture an image(s) of her earnings data, e.g., timesheet and other work-related data, the worker may also provide data for accessing her bank account (e.g., an account number, user ID, password, electronic token, etc.) such that the app can access the worker's bank account and effect various transactions on behalf of the worker, i.e., the app user.

More generally, the user may capture an image of earnings data, which typically are in the form of a timesheet. From this image, the system determines which days were worked, the number of hours worked per day, and a running total number of hours worked. In certain embodiments, additional information about the worker, her schedule, and/or about the employer may be captured. Additional information may include, for the purposes of illustration and not limitation, an employee's name, an employee's Identification or employee number, the employer's timesheet system (e.g., ADP, Kronos, Workbrain, and the like), and/or hardware used (e.g., HP, Samsung, and the like). The information may also include the employer's store or location, the employer's pay period, and departments worked in by the user (e.g., cosmetics, maintenance, store cleaning, etc. The information may also include the user's clock-in and clock-out times, and the user's break times along with dates, hours worked in each shift, day and/or pay period, status or classification of hours (e.g., hours worked and approved, hours worked but not yet approved, hours scheduled to be worked, and so forth), a paycode (e.g., a multiplier) for each set or sub-set of classified hours (e.g., regular time, holiday time, overtime, unpaid time, training time, travel time, tool or equipment maintenance time, in store time, out of store delivery time, and the like), sick and vacation time used and available for use, and/or tips received by the user. Furthermore, additional information may also include the system time when the image was taken, the URL for the employer's timesheet system, phone time when the image was taken, the geographical location data when the image was taken, and so forth. In some variations of the invention, the geographical location data may be used to confirm that the worker was at her designated work location during the work period, for the hours worked, and/or when the image was captured.

In some embodiments, the system may accept automated data feeds from the employer's time tracking and payment system such that the user is not required to provide an image of her timesheet, and instead the data may be transmitted electronically via a secure network connection. The data may, in various embodiments, be modified such that only a certain percentage of the total wages are communicated to the system and made available to the worker for early payment prior to the end of the pay period. Advantageously, sending earnings data directly from the employer or employer's payroll system to a remote processing device can expedite reconciliation on the worker's customary pay day. However, in certain cases, pay may not be available for acceleration if the funds are already committed on the pay date. For example, if the worker's bank account is negative, then the worker's financial institution may prioritize covering the negative balance over any other debit transaction. As such, in this case, only the uncommitted portion of the pay is available for acceleration. The number of hours that are allocated to cover any negative balance are not available for acceleration.

The data collected from the image, mobile device and/or data feed(s) can also be used to establish the reliability of the data captured (i.e., that the particular user actually worked those hours). For example, the system may confirm that the name on the timesheet matches the name associated with the bank account information provided. The system may also confirm whether the image is from the correct time tracking system based on the employer name derived from the pay deposits in the bank account. Further, the system may confirm that the picture was physically taken at the workplace, whether the picture was taken at the correct day and time as compared to the dates and times worked, and if other data points such as pay period, URL, and hardware used match what is known for or provided by the employer.

Figure 2:
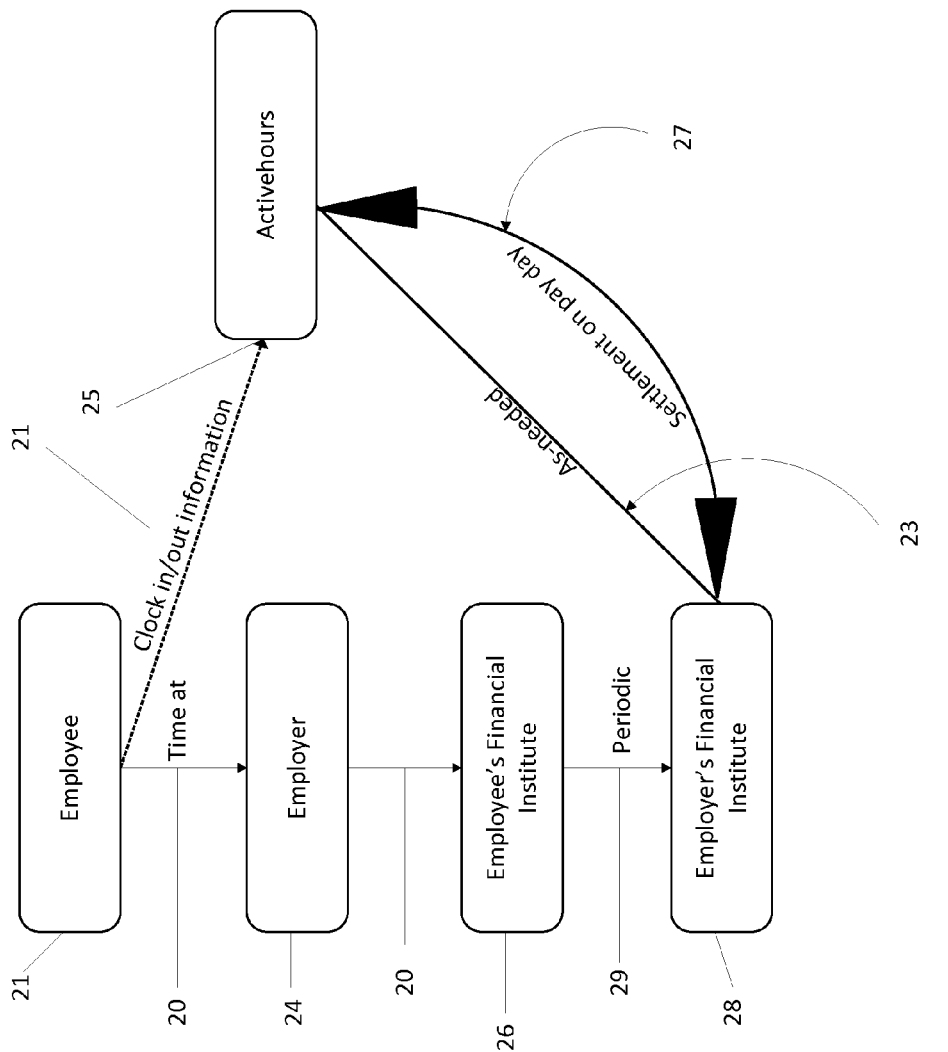
FIG. 2 shows a flow chart of the communication of data and payments in accordance with some embodiments of the present invention.

FIGS. 1 and 2 provide flow charts of exemplary embodiments of methods for capturing work time, accrued and unpaid wages, and allowing the worker to access owed monies prior to the end of the pay period in accordance with the invention as claimed. Referring to FIGS. 1 and 2, in a first step the worker 22 shows up at work at her normal place of business and clocks-in (Time$_1$) (STEP 1) in the manner provided for by her employer 24 and in accordance with the employer's standard operating procedures. At close of business or at the end of the business day, once the worker 22 has completed her shift, the worker 22 clocks-out (Time$_2$) (STEP 2) in the manner provided for by the employer. Accordingly, at the end of the business day, the worker 22 has earned a gross amount equal to the number of hours and any fractions thereof she has worked, i.e., Time$_1$-Time$_2$, multiplied by her hourly rate or, if a salaried employee, the fraction of her salary for a day's work. If the worker 22 is paid hourly, if the number of hours or fractions thereof worked, i.e., Time$_1$-Time$_2$, exceeds the worker's normal work hours (typically about 4 to 8 hours), the gross amount may also include overtime.

Once the worker 22 has clocked-out (STEP 2), she has effectively earned and is entitled to income based on her labor but likely has not been and will not be paid until, for example, the end of the week, the end of every second week, mid-month and/or the end of the month. Having clocked-out, the worker 22 has created a record of her work, e.g., a timesheet 20, which she can acquire or capture, e.g., take, an image of (STEP 3), e.g., using an image recording device. The image of the timesheet may be an image of a screen shot, an image of an actual sheet of paper, an image of the worker's punched time card, and the like.

The image recording device can include, for example, a digital camera that may be incorporated into any of a cellular or mobile telephone, a laptop computer, a tablet computer, a smartphone, a smartpad, a smartwatch, a pair of Google® glasses, and so forth. In some variations, the device into which the digital camera is incorporated is in electronic communication with a processing device, a data storage medium, and a communication network interface. Alternatively, the image(s) taken by the digital camera is capable of being uploaded onto a removable memory device, e.g., a memory stick, flash drive, and the like, and subsequently downloaded onto a processing device 25 that is in electronic communication with a data storage medium, a communication network interface, and the like. The timesheet image data 21 may then be provided to a remote processing device 25 (STEP 4), e.g., via a communication network, using the network interface, e.g., a Web browser.

At the remote processing device 25, the timesheet image data 21 can be screened for reliability and for sufficient information (STEP 5). As to the reliability of the image data 21, the authenticity of the timesheet images can be enhance using geo-coding data or a worker's data fingerprint to make sure the image was taken in the employer's facilities. For example, a worker's data fingerprint may include a geographical location finder (e.g., a global positioning system (GPS), a signaling system such as SS7, CCSS7, and the like), to verify that the worker 22 was at her place of employment when she transmitted the image data 21; sensor data (e.g., using an accelerometer, a gyroscope, a thermal device, other such sensors, or a combination thereof), to verify that the worker 22 is the actual worker; and so forth. For example, two- and/or three-dimensional acceleration data corresponding to a unique gesture (e.g., an air signature) made by the worker 22, e.g., using the image recording device and/or the processing device 25, may be recorded, transmitted along with the image data 21, and compared at the remote processing device 25 with previously stored gesture data that the worker 22 has pre-recorded as unique to the worker 22. Timestamp data from her employer 24, inclusion of visual markings such as watermarks, QR codes, and/or random alphanumeric codes, which may be authenticated by the system prior to providing access to the funds, may also be used to authenticate timesheet images.

As to its sufficiency, the data collected from the image, mobile device, and/or data feed(s) can also be used to establish the reliability of the data captured, including that the particular user 22 actually worked those hours. For example, the system may confirm that the name on the timesheet matches the name associated with bank account information provided by the worker 22 beforehand. In some cases, missing or obfuscated data may be "filled in." For example, if the clock-in/out report 20 does not show the user name, but the schedule does, then the worked time can be associated with the user name by comparing the worked time to the scheduled time. If there is sufficient match, the system can assume to an appropriate level of certainty that the worked hours are for that particular worker 22.

The system may also confirm that the image data 21 are from the correct time tracking system based on the employer name derived from pay deposits made to the user's bank or bank account 28. The system may also confirm that the image was actually taken at the workplace, that the image was taken at the correct day and time as compared to the dates and times worked, and if other data points such as pay period, employer's URL, and employer's hardware used match what is known for or provided by the employer 24.

If insufficient data are provided and/or if the image data 21 are deemed unreliable, the remote processing device 25 may be adapted to generate notification (STEP 6A), e.g., an email, a text message, a Tweet, and so forth, which may include the reason(s) why the worker's request cannot be processed further, and to transmit the notification (STEP 6A) to the worker's processing device. Otherwise, if sufficient data are provided and the image data 21 are deemed reliable, the remote processing device 25 may catalogue the data (STEP 6B), e.g., in an account previously established by the worker. As previously mentioned, the worker 22 will have already established a bank account at a financial institution 28 and, moreover, provided data 23 to the remote processing device 25 for accessing her bank account (STEP 7), e.g., an account number, user ID, login password, electronic token, and so forth, such that the remote processing device 25 and/or a user app can access the worker's bank account 28 and/or effect various transactions 23 on behalf of the worker 22 or with the worker's bank account.

By providing the remote processing device 25 with her login data 23 for a financial account 28, the worker 22 may also authorize the remote processing device 25 and/or the app to access her recent banking transactions, including deposits of her wages. The deposits may be identified automatically by searching for transactions from a specified source, by date, by amount, by description, and so forth. Alternatively, deposits may be manually identified in cases where the user 22 deposited a physical check.

Each time earnings data 21, e.g., a new image of the timesheet or work record, are received from a worker 22 (or image data 21 are received electronically), the remote processing device 25 updates the receivable amount (STEP 6B). This process may be performed on a regular schedule (e.g., daily, weekly, etc.), at instruction from the user, or randomly.

The system is further adapted to calculate take-home pay earned but not paid for the application user 22 (STEP 8). For example, transaction data from the worker's bank account 28 can be used as indicia of the amount and the frequency of pay. By dividing historical take-home pay by the hours worked during that historical time period, the worker's take-home pay per hour can be determined. In some cases, the amounts may be known exactly, whereas in other instances the amounts may be estimated, e.g., assuming 30 hours per week. In other implementations, the worker 22 may provide parameters that define her work schedule, pay scale, etc. The calculated (or provided) hourly wage rate may then be multiplied by the hours worked during the pay period(s) for which the worker's 22 pay is pending. This amount represents the "payable" amount due from the employer 24 to the worker 22 (STEP 8). When multiple pay rates are present, e.g., corresponding to different hourly rates (i.e., when the worker 22 is at the store as opposed to out making a delivery, or when overtime or weekend/holiday work pays at a different rate), a set of simultaneous equations can be established across multiple pay periods to determine each of the take-home pay rates for the worker 22.

The remote processing device 25 is further configured and arranged to store for each worker 22 a real-time or substantial real-time "payable" amount due from the employer 24 to the worker 22. Advantageously, using the system app on her processing device, the worker 22 can view her hours worked that have not yet been paid but that are available to be accelerated (STEP 9). For example, the worker 22 may use her network interface, e.g., Web browser or smartphone app, to establish communication with the remote processing device 25. After logging in, e.g., by establishing her identity, the worker 22 can access the data memory of the remote processing device 25, e.g., the worker's "payable" amount due from the employer 24 (STEP 9), which data can be displayed on a display device integrated or incorporated into the worker's client device.

In some embodiments of the present invention, the worker 22 may accelerate payment by requesting an early payment on her "payable" amount due from her employer 24 (STEP 10). Accelerating payroll allows workers 22 to access earned but unpaid wages when it is most needed without requiring the employer 24 to implement any new applications, policies or systems. Moreover, by analyzing the worker's spending habits and historical spending data from her bank account 28, the system can identify non-discretionary or repetitive expenses, e.g., rent, utilities, car payments, etc., and calculate when the worker 22 has worked a sufficient amount of time to cover these expenses. Any additional income for that period can be considered "disposable income," which can be used to allocate the hours worked and the corresponding "payable" income to selected non-discretionary expenses and/or to all non-discretionary expenses and/or to trigger certain actions, such as notifying the user that she has "disposable" income that can be accelerated; alerting merchants of available "disposable" income, to target these users; and so forth.

More specifically, the worker 22 may select how many hours she would like to accelerate for early payment or alternatively select a lump sum dollar amount (STEP 10) and how she would like to use the committed hours/lump sum amount. There may be multiple options for the hours to be used. For example, electronic funds 23 may be transferred, e.g., via ACH, to the user's bank account 28, sent and deposited immediately to the user's bank account 28 over a debit/ATM network, credited onto a prepaid card or electronic wallet or as store credits, and so forth (STEP 11). Store credit can be redeemed by codes or information sent to their mobile or connected devices or through a card. Fees may be charged for some or all of these delivery methods. At the end of the pay period (payday), the hours worked during the completed pay period that have already been captured and paid are no longer considered as receivable and are removed from the calculation as being "available."

In some variations, the system may be set up to monitor the worker's bank account 28, for example, to detect when an overdraft fee is about to be assessed. When the account 28 has or is about to have a negative balance, the system (either with the worker's permission or automatically) can push "payable" money 23 into the user's bank account 28 through a method that posts immediately, e.g., similar to an ATM credit or intra-bank transfer, helping the user 22 avoid the overdraft fee, which is usually assessed through a batch process at the end of each day.

Referring to FIG. 2, to complete the transaction, on the worker's customary payday, the employer's financial institution 26 pays the worker 22 for her labor. Payment may come as a direct deposit 29 from the employer's financial institution 26 into the worker's account 28 at the worker's financial institution or in the form of a check that the worker 22 deposits into her account 28. With money in the bank, any accelerated payment(s) 23 transferred from the remote processing device 25 into the worker's account 28 is reimbursed 27 to "balance the books." Alternatively, reimbursement may come directly from the employer's financial institution 26 instead of from the worker's financial institution.

Figure 3:
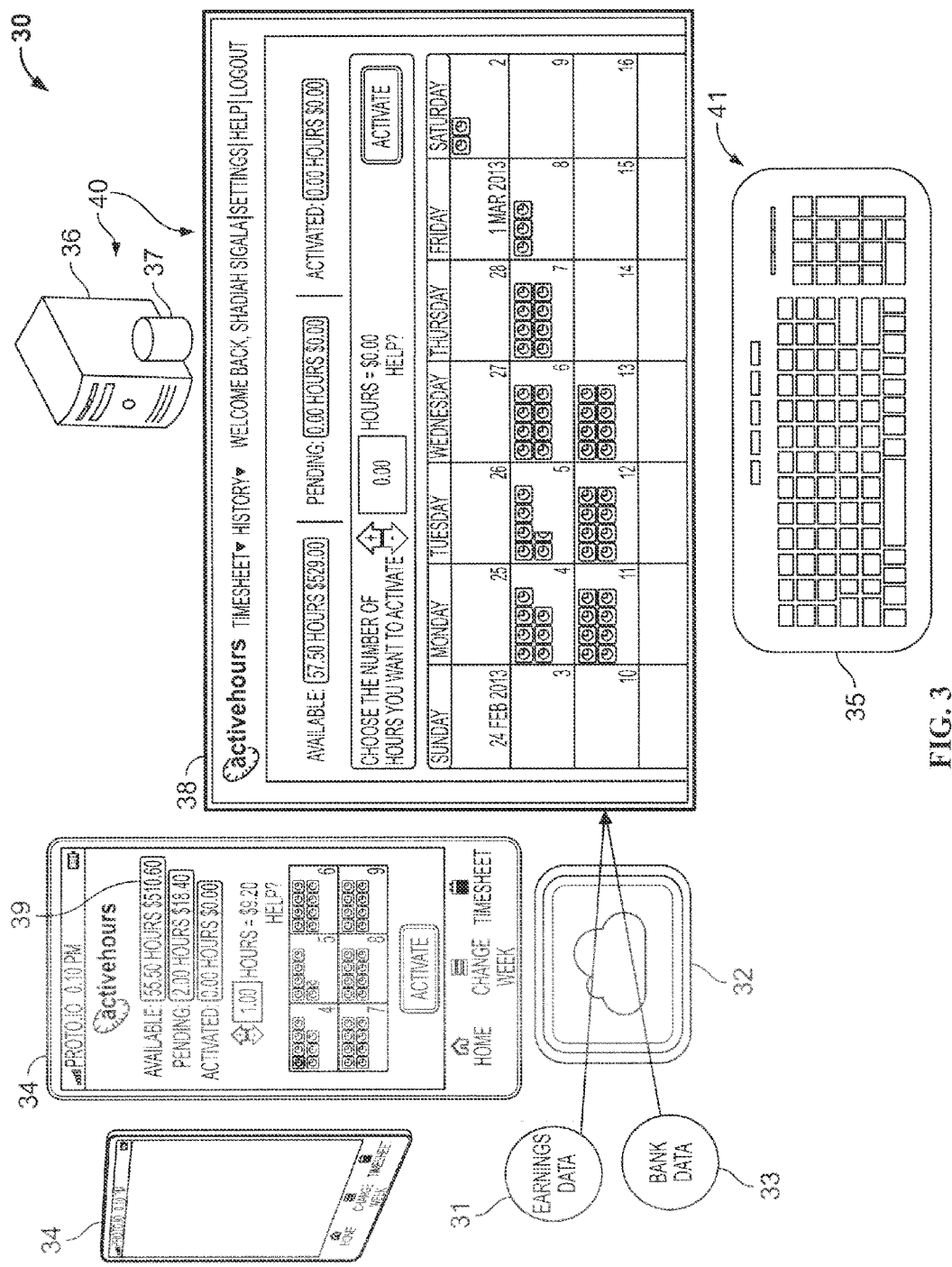
FIG. 3 shows a pictorial of an illustrative embodiment of a system in accordance with the present invention.

FIG. 3 shows an illustrative embodiment of a system 30 and a related application therefor in accordance with the present invention. The embodiment illustrates the flow of information, i.e., earnings data 31 (e.g., from the worker 22) via a client device (or server) 34 and a communication network 32 to a remote server 40 and from a processing device at the worker's financial institution 28, i.e., bank data 33, through a communication network 32 to the remote server 40. The client device 34 may include a processing device, memory, data storage, a network interface, e.g., a Web browser, and a display device 39. The remote server 40 may include a processing device 36, a network interface, memory 37, and a central database. In some instances, the data may be stored remotely in the central database using a cloud-based system 32 such the worker 22 can access the data from any device 34 (e.g., mobile phone, tablet, PC, etc.) having connectivity through a communication network 32, e.g., the Internet, World Wide Web, a local area net (LAN), an intranet, and a wide area net (WAN).

It is understood that the methods and systems 30 described may contain software, middleware, hardware, and any combination thereof connected to, coupled with, and/or in communication with a communication network 32. For simplicity, "Internet" will be used to describe the communication network 32. However, those skilled in the art can appreciate that the methods and systems 30 disclosed herein can be applied to any communication network 32. Computing/processing devices 34, 40 are capable of communicating with each other via the Internet 32, and it should be appreciated that the various functionalities of the components may be implemented on any number of devices.

The invention may be practiced using any communications network 32 capable of transmitting Internet protocols. A communications network 32 generally connects a client 34 with a server 40, and in the case of peer-to-peer communications, connects two peers. The communication may take place via any media such as standard telephone lines, LAN or WAN links (e.g., T1, T3, 56kb, X.25), broadband connections (ISDN, Frame Relay, ATM), wireless links (802.11, Bluetooth, 3G, CDMA, etc.), and so on. The communications network 32 may take any form, including but not limited to LAN, WAN, wireless (WiFi, WiMAX), near-field (RFID, Bluetooth). The communications network 32 may use any underlying protocols that can transmit Internet protocols, including but not limited to Ethernet, ATM, VPNs (PPPoE, L2TP, etc.), and encryption (SSL, IPSec, etc.)

The invention may be practiced with any computer system configuration, including hand-held wireless devices 34 such as mobile phones or personal digital assistants (PDAs), tablet computers, smartphone, smartpads, smartwatches, Google® Glasses, multiprocessor systems, microprocessor-based or programmable consumer electronics, minicomputers, mainframe computers, computers running under virtualization, etc.

The invention may also be practiced in distributed computing environments where tasks are performed by multiple remote processing devices 40 that are linked through a communications network 32. In a distributed computing environment, program modules may be located in both local and remote computer storage media including memory storage devices.

The invention's data store may be embodied using any computer data store, including but not limited to, relational databases, non-relational databases (NoSQL, etc.), flat files, in memory databases, and/or key value stores. Examples of such data stores include the MySQL Database Server or ORACLE Database Server offered by ORACLE Corp. of Redwood Shores, Calif., the PostgreSQL Database Server by the PostgreSQL Global Development Group of Berkeley, Calif., the DB2 Database Server offered by IBM, Mongo DB, Cassandra, or Redis. The invention may be practiced using any computer or processing system 34, 40, which may include a general purpose computing device comprising a processing unit 36, a system memory 37, a data storage medium, and a system bus that couples various system components including the system memory 37 to the processing unit 36.

Computers 34, 40 typically include a variety of computer readable media that can form part of the system memory 37 and be read by the processing unit 36. By way of example, and not limitation, computer readable media may comprise computer storage media and communication media. The system memory 37 may include computer storage media in the form of volatile and/or nonvolatile memory such as read only memory (ROM) and random access memory (RAM). A basic input/output system (BIOS), containing the basic routines that help to transfer information between components, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Mac OS operating system, Google Android operating system, Apple iOS operating system, or another operating system or platform.

At a minimum, the memory 37 may include at least one set of instructions that is either permanently (non-volatile) or temporarily (volatile) stored. The processor 36 executes the instructions that are stored in order to process data. The set of instructions may include various instructions that perform a particular task or tasks. Such a set of instructions for performing a particular task may be characterized as a program, software program, software, engine, module, component, mechanism, or tool.

The system 30 may include a plurality of software processing modules stored in a memory 37 as described above and executed on a processor 36 in the manner described herein. The program modules may be in the form of any suitable programming language, which is converted to machine language or object code to allow the processor or processors 36 to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Basic, C, C++, CSS, HTML, Java, SQL, Perl, Python, Ruby and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, Storage Area Networking devices, solid state drives, and the like. The storage media are typically connected to the system bus through a removable or non-removable memory interface.

The processing unit 34, 40 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors 36 and/or memories 37 of the computer system 40 need not be physically in the same location. Each of the processors 36 and each of the memories 37 used by the computer system 40 may be in geographically distinct locations and be connected so as to communicate with each other in any suitable manner. Additionally, it is appreciated that each of the processor 36 and/or memory 37 may be composed of different physical pieces of equipment.

A user 22 may enter commands and information into the systems that embody the invention through a user interface 41 that includes input devices such as a keyboard 35 and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit 36 through a user input interface that is coupled to the system bus, but may be connected by other interface and bus structures, such as a parallel port, game port or a universal serial bus (USB).

The systems 30 that embody the invention may communicate with the user via notifications sent over any protocol that can be transmitted over a packet-switched network or telecommunications network 32. By way of example, and not limitation, these may include SMS messages, email (SMTP) messages, instant messages (GChat, AIM, Jabber, etc.), social platform messages (Facebook posts and messages, Twitter direct messages, tweets, retweets, etc.), and mobile push notifications (iOS, Android).

One or more monitors or display devices 38, 39 may also be connected to the system bus via an interface. In addition to display devices 38, 39, computers 34, 40 may also include other peripheral output devices, which may be connected through an output peripheral interface. The computers 34, 40 implementing the invention may operate in a networked environment using logical connections to one or more remote computers, the remote computers typically including many or all of the elements described above.

Figure 4A:
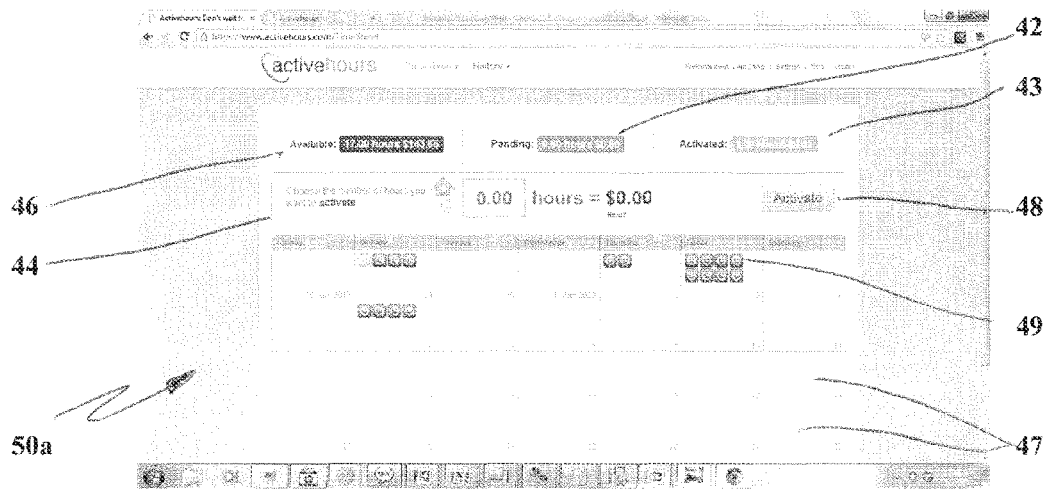
FIGS. 4A and 4B show exemplary screen shots of interactive user interfaces for accelerating payment in accordance with some embodiments of the present invention.
Figure 4B:
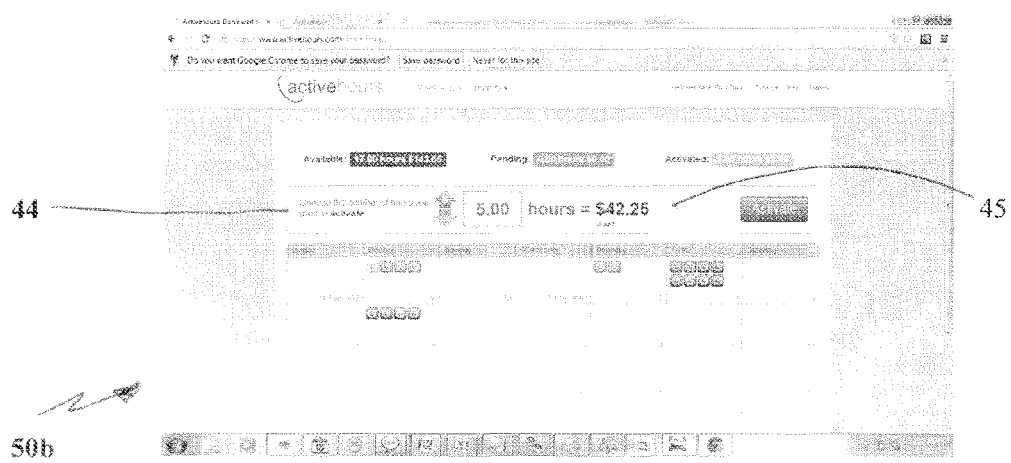

FIGS. 4A and 4B illustrate exemplary screen captures 50a, 50b of an application implementing the invention in which worked hours are captured and allocated to particular working shifts and pay periods. Preferably, the screen is rendered on a display device 38, 39 associated with a corresponding processing device 34, 40 and more specifically with a display device 38, 39 having an interactive touch-screen capability. In some implementations, the screens 50a, 50b provide a calendar portion 47 showing days of the week and calendar dates. From earnings data 31, e.g., provided by the worker 22 via her timesheets, the processing device 36 can render and display hours worked icons 49 for each hour (or fraction thereof) worked on each day worked. Using data provided by the worker 22, from the worker's employer 24, and/or from the worker's financial account 38 and any of the algorithms described above, the processing device 36 may calculate the unit value of an hour worked, the number of hours worked, and the value thereof that are available for early (or "accelerated") payment to the worker 22 as well as the number of hours worked and the value thereof that are pending or otherwise not available for accelerated payment. Advantageously, the processing device 36 of the system 40 can display and continuously update in real-time: the available hours and/or pay earned but not paid 46, the pending hours worked and/or pending pay earned 42, and/or the estimated value of an hour worked 43.

The processing device 36 may include an application that enables a remote user 22 to view the display on the display device 39 of her processing device 34 and, moreover, to interact with the display to effect an early receipt of monies earned prior to payday. For this purpose, the display can include an input area 44 in which the user 22 can input the number of hours or fractions thereof that the worker 22 would like to activate, which is to say, accelerate payment, and an output area 45 that displays the mathematical product of the user's requested activation input 44 and the estimated value of an hour worked 43 to calculate a desired activation amount 45. In some case, the user 22 may modify the number of hours to be activated (up or down) and in certain cases limitations on these modifications (upper bounds based on hours worked, a percentage of hours worked, committed or non-discretionary expenses, lower bounds for minimum deposit amounts, etc.) may govern the changes the worker 22 may make. Alternatively, a user 22 may enter a desired accelerated payment 45 from which the processing device 36 is capable of determining the number of hours corresponding to the accelerated payment 45 amount.

In order to complete the transaction, the user 22 can click-on an activate button 48, which may cause the desired activation amount 45 to be applied to, for example, the worker's financial account 28 and/or to some other pre-established obligation of the worker 22, e.g., rent payment, mortgage payment, credit card payment, utility payment, loan payment, and the like. The source of the funds for the activation amount 45 can be a third-party financial institution or a financial account associated with the manager or owner of the remote server 40.

At the worker's normal pay day, once the worker 22 has been paid by her employer 24 and the funds are available for use in the worker's financial account 28, an amount equal to or greater than the accelerated activation amount 45 paid early to the worker 22 can be automatically re-paid to the third-party financial institution or to the financial account associated with the manager or owner of the remote server 40. In some variations, during repayment, workers 22 may be charged a fee for the early payment. For example, the fee can include a flat, per-event fee, a fee corresponding to some percentage of the activated amount, a fee based on interest at a pre-established annual percent rate for the number of days between the early payment and repayment, or some combination of these.

Although internal components of the computer are not shown, those of ordinary skill in the art will appreciate that such components and the interconnections are well known. Accordingly, additional details concerning the internal construction of the computer need not be disclosed in connection with the present invention.

The invention claimed is:

1. A method for providing early payment for earned, accrued wages to a worker, the method comprising:
   receiving, at a remote processing device, over an electronic network, from at least one of the worker and a third-party tracking and payment system, current earnings data for the worker;
   receiving, at the remote processing device, from the worker, a digital image captured on an image recording device including geographical information about a location of the worker when the digital image was captured for accessing and effecting transactions in a financial account associated with the worker;
   authenticating, by the remote processing device, a reliability of the captured digital image;
   accessing, by the remote processing device, the financial account associated with the worker and stored on a processing device at a financial institution maintaining the financial account to calculate an hourly wage for the worker using pay cycle assumptions and historical pay data, comprising a temporal frequency of wage deposits and amount of the wage deposits, from the financial account;
   calculating, by the remote processing device, the hours for which payment can be accelerated using the current earnings data for the worker;
   calculating, by the remote processing device, a value of funds to be transferred to the worker based on the hourly wage and accelerated hours; and
   debiting, by the remote processing device, the financial account associated with the worker based upon the calculated value of funds.

2. The method of claim 1, wherein the worker's earnings data include a timesheet showing hours the worker worked for an employer.

3. The method of claim 2, wherein the timesheet comprises pay data comprising at least one of: a worker's name, days worked by the worker, hours worked by the worker, work day clock-in start times, work day clock-out end times, global positioning data, an identifier of the worker, a worker number, a worker's department, a worker's break time, a classification of the hours worked by the worker, tips received by the worker, a worker's available sick time, and a worker's available vacation time.

4. The method of claim 1, wherein the worker's earnings data comprise information about the employer including at least one of: a name of the employer, an employer's URL, an employer's business location, an employer's pay period, a timesheet system used by the employer, an identifier of the employer; hardware used by the employer, payroll software used by the employer, and paycodes for each set of classified hours.

5. The method of claim 1 further comprising establishing a reliability and sufficiency of the received earnings data.

6. The method of claim 5, wherein establishing reliability and sufficiency of received earnings data includes at least one of:
   confirming that the worker was at a designated work location during work hours when the earnings data were transmitted;
   confirming that a name associated with the earnings data corresponds to a name associated with the account associated with the worker;
   confirming that the earnings data were captured at an employer's business location; and
   confirming that the earnings data correspond to the employer's tracking and payment system.

7. The method of claim 6, wherein confirming that the earnings data were reliably captured is selected from the groups consisting of: using a worker's data fingerprint to ensure the received earnings data were acquired at the employer's business location; using geo-coding data to ensure the received earnings data were acquired at the employer's business location; using timestamp data to ensure the received earnings data from the employer were captured after the work was completed; using watermarks to ensure the received earnings data from the employer were transmitted from the employer's business systems; using at least one accelerometer to ensure the data received matches what would be expected during work; using at least one thermal sensor to ensure the data received matches what would be expected during work; and using QR codes to ensure the received earnings data from the employer were transmitted from the employer's systems.

8. The method of claim 1, wherein receiving, from the worker, data for accessing and effecting transactions in an account associated with the worker comprise receiving at least one of the following from the worker:
   an account identification number;
   an account user identification;
   a login password;
   a login passcode; and
   an electronic token.

9. The method of claim 1, wherein the digital image captured on an image recording device comprises at least one of an image of a display device screen shot, an image of a sheet of paper, an image of a time card, an image of a punched time card, and a digital image of a timesheet prepared by the worker.

10. The method of claim 1, where debiting the account associated with the worker based upon the calculated value of funds includes receiving from the worker a request for an accelerated payment of funds.

11. The method of claim 1 further comprising analyzing at least one of a worker's spending habits and a worker's historical spending data to determine when the worker has disposable income.

12. The method of claim 11 further comprising alerting the worker of available disposable income.

13. The method of claim 11 further comprising alerting a third party merchant of the worker's available disposable income.

14. The method of claim 1 further comprising monitoring the account associated with the worker for at least one of a negative balance and a likelihood of a negative balance.

15. The method of claim 14 further comprising automatically transferring some portion of the value of funds to be transferred to the worker to at least one of eliminate the negative balance or avoid a negative balance.

16. The method of claim 1, wherein the image recording device comprises at least one of a digital camera, a cellular telephone, a mobile telephone, a tablet computer, a laptop computer, a smartphone, a smartpad, and a smartwatch.

17. The method of claim 1, wherein authenticating the captured digital image comprises identifying at least one visual marking included in the digital image, the at least one visual marking comprising at least one of a watermark, a QR code, and a random alphanumeric code.

18. The method of claim 1, wherein the digital image captured on an image recording device further includes information about a system time when the digital image was captured.

19. The system of claim 1, wherein the image recording device comprises at least one of a digital camera, a cellular telephone, a mobile telephone, a tablet computer, a laptop computer, a smartphone, a smartpad, and a smartwatch.

20. The system of claim 1, wherein authenticating the captured digital image comprises identifying at least one visual marking included in the digital image, the at least one visual marking comprising at least one of a watermark, a QR code, and a random alphanumeric code.

21. A system for providing payment for earned, accrued wages to a worker, the system comprising:
a memory for storing computer readable instructions, which, when executed by a processor, create an instance of an application operating on a mobile device; and
a processor for executing some of the stored computer readable instructions, wherein executing comprises:
receiving, over an electronic network, from at least one of the worker and a third-party tracking and payment system, current worker's earnings data;
receiving a digital image captured by the worker on an image recording device, the digital image including geographical information about a location of the worker when the digital image was captured, for accessing and effecting transactions in a financial account associated with the worker;
authenticating, by the remote processing device, a reliability of the captured digital image;
accessing the financial account associated with the worker and stored on a processing device at a financial institution maintaining the financial account to calculate an hourly wage for the worker using pay cycle assumptions and historical pay data, comprising a temporal frequency of wage deposits and amount of the wage deposits, from the financial account;
calculating the hours for which payment can be accelerated using the current earnings data for the worker;
calculating a value of funds to be transferred to the worker based on the hourly wage and accelerated hours; and
debiting the financial account associated with the worker based upon the calculated value of funds.

22. The system of claim 21, wherein the digital image captured on an image recording device comprises at least one of an image of a display device screen shot, an image of a sheet of paper, an image of a time card, an image of a punched time card, and a timesheet showing hours the worker worked for an employer.

23. The system of claim 22, wherein the timesheet comprises pay data comprising at least one of: a worker's name, days worked by the worker, hours worked by the worker, work day clock-in start times, work day clock-out end times, global positioning data, an identifier of the worker, a worker number, a worker's department, a worker's break time, a classification of the hours worked by the worker, tips received by the worker, a worker's available sick time, and a worker's available vacation time.

24. The system of claim 21, wherein the worker's earnings data comprise information about the employer including at least one of: a name of the employer, an employer's systems' URL, an employer's business location, an employer's pay period, a timesheet system used by the employer, an identifier of the employer; hardware used by the employer, payroll software used by the employer, and paycodes for each set of classified hours.

25. The system of claim 21, wherein the worker's earnings data include automated data provided by an employer's tracking and payment system.

26. The system of claim 21, wherein calculating an hourly wage for the worker is calculated using at least one of pay data from the worker's account and the hours worked for the pay period from the timesheet, and pay cycle assumptions.

27. The system of claim 21, wherein calculating the hours for which payment can be accelerated is calculated based on the hours worked that have not yet been paid by the employer.

28. The system of claim 21 further comprising calculating hours for which payment cannot be accelerated.

* * * * *